United States Patent [19]

Imai et al.

[11] Patent Number: 5,781,020
[45] Date of Patent: Jul. 14, 1998

[54] METHOD OF CALCULATING AN IMPEDANCE OF AN ELECTROMAGNETIC PART TO WHICH ROTATIONAL BODY SHAPE APPROXIMATION IS APPLIED, AND AN APPARATUS FOR THE SAME

[75] Inventors: Tetsuya Imai, Moriguchi; Kazuyuki Sakiyama, Shijyonawate, both of Japan

[73] Assignee: Matsushita Electric Industrial Co., Ltd., Osaka, Japan

[21] Appl. No.: 638,999

[22] Filed: Apr. 24, 1996

[30] Foreign Application Priority Data

Apr. 24, 1995 [JP] Japan ................................ 7-098195

[51] Int. Cl.[6] .......................... H05B 6/02; H05B 6/12; H01F 17/00
[52] U.S. Cl. ............................. 324/649; 364/482
[58] Field of Search ...................... 324/600, 225, 324/691, 654, 713, 602, 629, 649; 364/480, 481, 482, 483, 488

[56] References Cited

U.S. PATENT DOCUMENTS

5,436,846  7/1995  Fleming-Dahl .................. 364/481
5,488,566  1/1996  Woolsey ........................... 364/488

*Primary Examiner*—Walter E. Snow
*Attorney, Agent, or Firm*—Ratner & Prestia

[57] ABSTRACT

In the method of calculating the impedance of an electromagnetic part, the cost is low, the calculation time is short, and data for analysis are easy to handle. In order to allow an axially symmetric three-dimensional magnetic field analysis method to be applied, two kinds of modeling are conducted in a first step on the electromagnetic part; data indicative of the material properties, and various condition data such as an AC voltage to be applied to a winding, and predetermined boundary conditions are prepared in a second step; in a third step, each of two kinds of models is subjected to a coupled analysis of an axially symmetric magnetic field analysis and an electric circuit analysis, a current I flowing through a circuit in response to an application of a voltage E is obtained, and the impedance of each circuit is obtained in accordance with expression 1; and, in a fourth step, a corrected impedance of the electromagnetic part is calculated from the impedances of the models in accordance with expression 3.

14 Claims, 9 Drawing Sheets

EFFECT OF THE CORE VOLUME ON THE IMPEDANCE USING THE 3-D ANALYSIS
RESISTANCE R

Fig. 3(B)

EFFECT OF THE CORE VOLUME ON THE IMPEDANCE USING THE 3-D ANALYSIS
INDUCTANCE L

METHOD OF CALCULATING AN IMPEDANCE OF AN ELECTROMAGNETIC PART TO WHICH ROTATIONAL BODY SHAPE APPROXIMATION IS APPLIED, AND AN APPARATUS FOR THE SAME

BACKGROUND OF THE INVENTION

1. Field of the Invention

The invention relates to an impedance calculation method which can be used in calculation of the impedance of, for example, an electromagnetic part, and also to an impedance calculation apparatus.

2. Related Art of the Invention

Conventionally, the principle of induction heating is applied to a cooking device, a rice cooker, etc. A cooking device which uses induction heating comprises an induction heating structure consisting of a heating plate, a heating coil, etc., and a high-frequency inverter circuit which supplies a high-frequency power to the induction heating structure. In the design of such a cooking device, it is requested to realize both enhanced heating properties of the induction heating structure, and the impedance matching between the induction heating structure and the high-frequency inverter. To comply with this requirement, a magnetic field analysis method is employed as means for improving heating properties of the heating plate by controlling a high-frequency magnetic field produced in a space surrounding the induction heating structure.

A basic method which is employed in the prior art for calculating an impedance in accordance with a magnetic field analysis method will be described.

The Poisson s equation relating to a magnetic field, and an equation of an electric circuit including an AC voltage source which energizes a winding in a region to be analyzed are set as simultaneous equations. When solving the simultaneous equations, a current I flowing through the circuit in response to an application of a voltage E is obtained. The impedance Z can be expressed by the current I and the applied voltage E as shown in (Expression 1) below.

$$Z=E/I \qquad \text{(Expression 1)}$$

Most components of an electromagnetic part such as the heating structure of a rice cooker have a rotational body shape (i.e., a shape symmetrical about the same axis). In the specification, a rotational body shape means a three-dimensional body which is produced by rotating a plane figure around one line existing in the same plane. In other words, a member of a rotational body shape has a shape which is symmetrical about the axis.

When an electromagnetic part is configured only by rotational body shapes, the impedance is calculated by an axially symmetric magnetic field analysis method in which calculation can be performed by a computer in a relatively easy manner.

When even a portion of components constituting such an electromagnetic part have a shape which is not a rotational body shape, however, a conventional axially symmetric magnetic field analysis method cannot be used in principle in the calculation. Therefore, the impedance is calculated by a three-dimensional magnetic field analysis method in which shapes of components can be faithfully reflected.

However, such prior art techniques have problems as discussed below.

A method using a conventional three-dimensional magnetic field analysis method requires a calculation time which is much longer than that required in an axially symmetric magnetic field analysis method. In order to solve high-degree simultaneous equations having a number of unknowns for the three-dimensional magnetic field analysis, furthermore, a computer of the supercomputer class which is very expensive must be used. Since the distribution of an eddy current flowing through a conductor has a close relationship to the accuracy of analysis of a resistance, the eddy current distribution must be accurately considered in a three-dimensional magnetic field analysis. In order to realize this, technical knowledge and labors are required during a process of preparing data for analysis. A resistance corresponds to the real part of an impedance.

By contrast, when an axially symmetric magnetic field analysis method is used, results can be obtained within a short period of several to ten and several minutes by using an engineering workstation which may be available at a price of several million yen. Since methods of preparing data for axially symmetric analysis or two-dimensional analysis have been substantially established, data for analysis which can ensure a sufficient analysis accuracy can be easily prepared.

Consequently, it has been requested to develop a method of calculating the impedance of an electromagnetic part in which an effect of the shape of a component that is not axially symmetrical can be sufficiently reflected, the calculation time is short, and data for analysis can be easily handled.

In view of the above-discussed problems of the prior art, it is an object of the invention to provide a method which can calculate the impedance of an analysis object at a low cost and for a short time as compared with methods of the prior art, and in which data for analysis can be easily handled, and an apparatus for executing the method.

SUMMARY OF THE INVENTION

The first invention is an impedance calculation method for calculating an impedance of an analysis object comprising a member having a substantially rotational body shape and a member having a nonrotational body shape, wherein impedance analysis is conducted on a first analyzed model which is configured by a member of a substantially rotational body shape, impedance analysis for calculating an impedance of an analysis object comprising a member having a substantially rotational body and a member having a nonrotational body shape is conducted on a second analyzed model which is configured by said member of the rotational body shape and a rotational body including said member of the nonrotational body shape, said rotational body having an axis of rotation coincident with an axis of rotation of said member of the rotational body shape, and an impedance of said analysis object is calculated by using analysis results of said first and second analyzed models.

The second invention is an impedance calculation method according to the first invention, wherein said member of the rotational body shape includes a winding, and said member of the nonrotational body shape does not include a winding.

The third invention is an impedance calculation method according to the first invention, wherein an intermediate value of said analysis results of said first and second analyzed models is used as a result of the calculation of the impedance.

The fourth invention is an impedance calculation method according to the first invention, wherein, in the calculation of the impedance, a volume ratio of said member of the nonrotational body shape with respect to said rotational body having the axis of rotation coincident with said axis of rotation is used.

The fifth invention is an impedance calculation method according to the first invention, wherein, in the calculation of the impedance, the calculation is performed by using a calculation expression of Z=k×Z2+(1-k)×Z1 where a volume ratio k is (a volume of said member of the nonrotational body shape)/(a volume of said rotational body having the axis of rotation coincident with said axis of rotation), Z1 is an impedance which is obtained as the analysis result of said first analyzed model, Z2 is an impedance which is obtained as the analysis result of said second analyzed model, and Z is the impedance of said original analysis object.

The sixth invention is an impedance calculation apparatus for calculating an impedance of an analysis object comprising a member having a substantially rotational body shape and a member having a nonrotational body shape which comprises:

first analysis means for conducting impedance analysis on a first analyzed model which is configured by a member of a substantially rotational body shape second analysis means for conducting impedance analysis on a second analyzed model which is configured by said member of the rotational body shape and a rotational body including said member of the nonrotational body shape, said rotational body having an axis of rotation coincident with an axis of rotation of said member of the rotational body shape; and calculation means for calculating an impedance of said analysis object by using analysis results obtained by said first and second analysis means.

The seventh invention is an impedance calculation apparatus according to the sixth invention, wherein said member of the rotational body shape includes a winding, and said member of the nonrotational body shape does not include a winding.

The eighth invention is an impedance calculation apparatus according to the sixth invention, wherein said calculation means uses an intermediate value of said analysis results of said first and second analyzed models, as a result of the calculation of the impedance.

The ninth invention is an impedance calculation apparatus according to the sixth invention, wherein, in the calculation of the impedance, said calculation means uses a volume ratio of said member of the nonrotational body shape with respect to said rotational body having the axis of rotation coincident with said axis of rotation.

The tenth invention is an impedance calculation apparatus according to the sixth invention, wherein, in the calculation of the impedance, said calculation means performs the calculation by using a calculation expression of Z=k×Z2+(1-k)×Z1 where a volume ratio k is (a volume of said member of the nonrotational body shape)/(a volume of said rotational body having the axis of rotation coincident with said axis of rotation), Z1 is an impedance which is obtained as the analysis result of said first analyzed model, Z2 is an impedance which is obtained as the analysis result of said second analyzed model, and Z is the impedance of said original analysis object.

| Description of the Reference Numerals |
| --- |
| 1 input means |
| 2 storage means |
| 3 calculation means |
| 4 pot |
| 5 ferrite core |
| 6 double coil |
| 40 modeling means |
| P1 components of a rotational body shape (an axially symmetric shape) including a winding |
| P2 components of a nonrotational body shape (an axially asymmetric shape) |

PREFERRED EMBODIMENTS

Hereinafter, the invention will be described with reference to drawings showing it embodiment.

(1) Prior to the description of the embodiment of the invention, the points which led to the invention will be described.

First, the inventor has paid attention to the fact that, when a member of a rotational body shape and that of a nonrotational body shape coexist in an analysis object, the true value of the impedance of the analysis object has the following relationship.

The impedance of the original analysis object always exists between the impedance obtained in the case (Case B) where the member of a nonrotational body shape is removed from the analysis object and the analysis object consists only of the member of a rotational body shape, and that obtained in the case (Case A) where a virtual member of a rotational body which includes the member of a nonrotational body shape and which has an axis of rotation coincident with that of the member of a rotational body shape is assumed, and an object including the virtually assumed rotational body and the actual rotational body is set as a new analysis object.

Figure 1A:
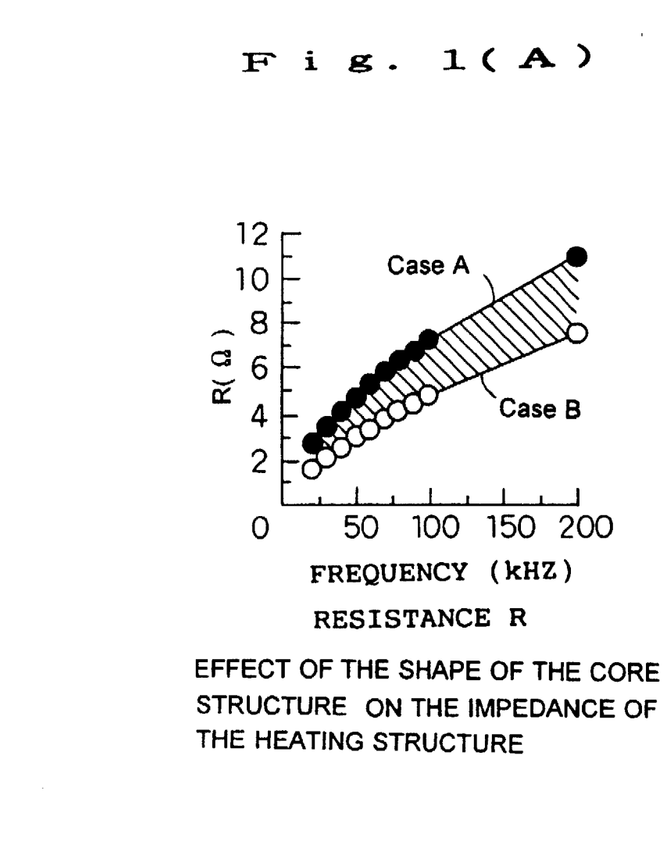
FIG. 1(A) is a graph showing variations of a resistance R of the impedance of an analysis object, in cases (A) and (B).
Figure 1B:
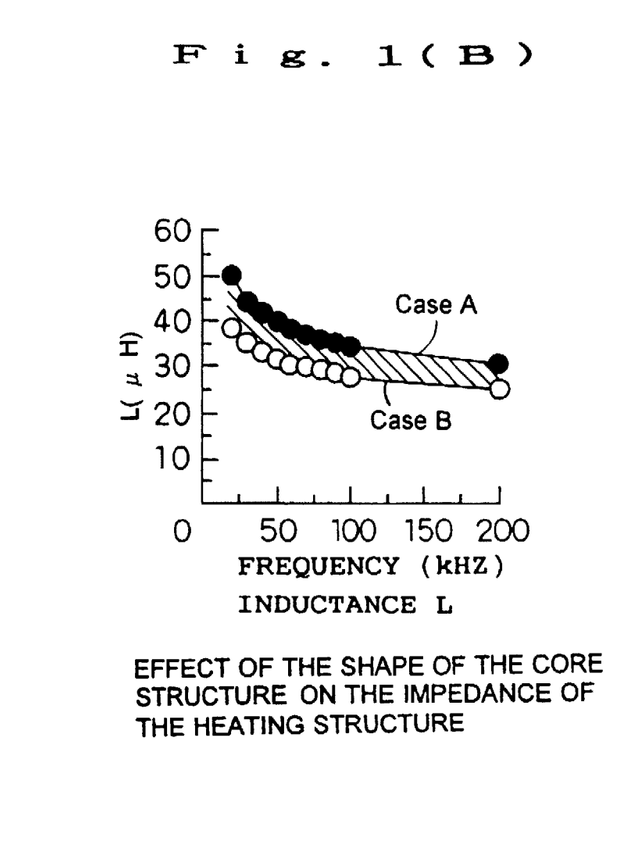
FIG. 1(B) is a graph showing variations of an inductance L of the impedance of the analysis object, in cases (A) and (B).

A specific example of the above description will be described. In the example, relationships between the shape of a ferrite core 5 of a rice cooker shown in FIG. 8, and the impedance of an analysis object were investigated by using a conventional axially symmetric magnetic field analysis method. FIGS. 1(A) and 1(B) show the results. In the rice cooker shown in FIG. 8, the actual impedance exists in the hatched regions between the curves of Cases A and B shown in FIGS. 1(A) and 1(B). The impedance Z is expressed by using the resistance R and the inductance L as shown in (Expression 2) below.

$$Z = R + j\omega L \qquad \text{(Expression 2)}$$

where j is the imaginary unit and $\omega$ is the angular frequency.

The inventor has noted that a variation of the impedance of the analysis object seems to be related to a change of the actual volume of the nonrotational body. It is needless to say that there are many other factors which seem to be related to a variation of the impedance of the analysis object, such as the weight, specific gravity, shape, and dimension in a radial direction of the nonrotational body. Among such many factors, the inventor has paid attention to a change of the actual volume of the nonrotational body with respect to a variation of the impedance of the analysis object.

Furthermore, the inventor has set up the hypothesis that a variation of the impedance is proportional to a change of the actual volume of the nonrotational body. According to this hypothesis, the impedance can be expressed by a linear interpolation expression such as (Expression 3) using a correction coefficient k. The correction coefficient k is a coefficient which is expressed as a volume ratio wherein the volume of the virtual rotational body described in Case A is a denominator and the actual volume of the member of a nonrotational body shape is a numerator. It is assumed that the virtual rotational body is made of the same material as that configuring the actual nonrotational body. The manner of configuring the virtual rotational body will be described later on the basis of a specific example of modeling of the analysis object.

$$Z = k \times Z2 + (1-k) \times Z1, \quad 0 \leq k \leq 1 \qquad \text{(Expression 3)}$$

where the volume ratio k is (the actual volume of the member of a nonrotational body shape)/(the volume of the rotational body virtually assumed as described above), Z1 is the impedance in Case B (corresponding to the impedance which is obtained as an analysis result of a first analyzed model according to the invention), Z2 is the impedance in Case A (corresponding to the impedance which is obtained as an analysis result of a second analyzed model according to the invention), and Z is the impedance of the original analysis object.

In order to confirm the effectiveness of the hypothesis, i.e., that of the calculation method according to the linear interpolation, the inventor has conducted verification in the following manner.

Figure 2A:
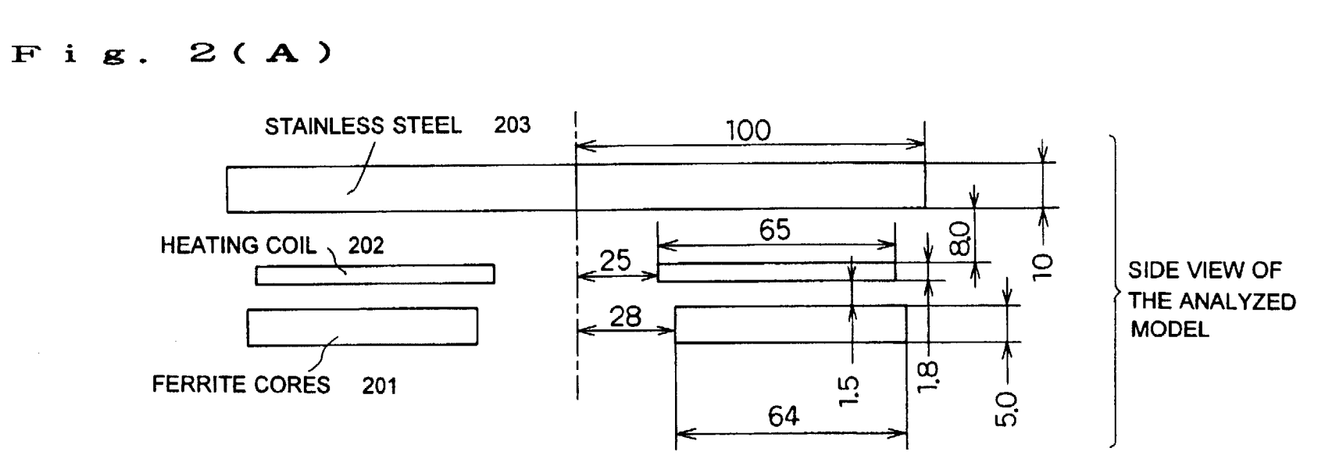
FIG. 2(A) is a side view of an analyzed model which was used in the verification.
Figure 2B:
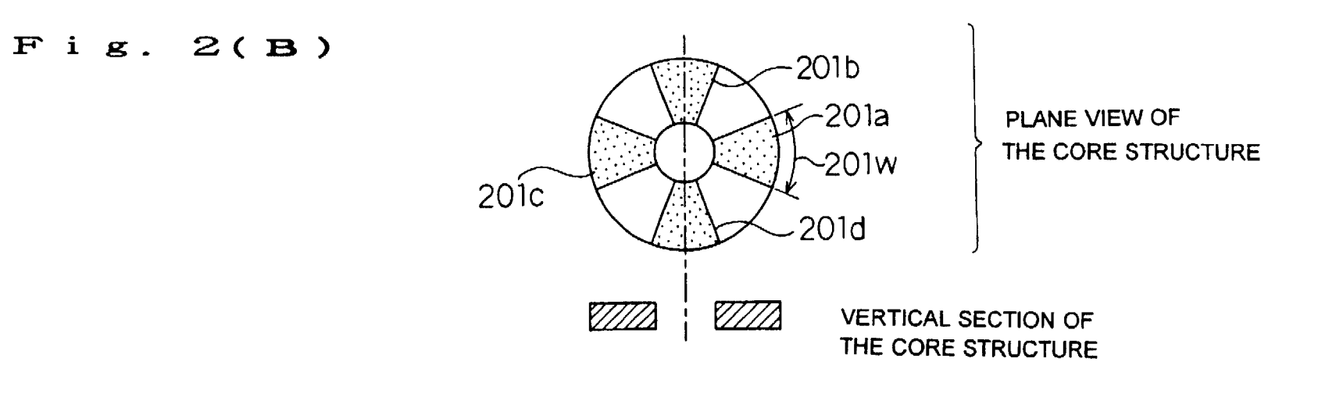
FIG. 2(B) shows plan and vertical section views of a ferrite core 201 used in the analyzed model shown in FIG. 2(A).

FIG. 2(A) is a side view of an analyzed model which is used in the verification. The analyzed model comprises a plate-like member 203 which is made of stainless steel and has a rotational body shape, a heating coil 202 having a rotational body shape, and a ferrite core 201 having a nonrotational body shape. FIG. 2(B) shows plan and vertical section views of the ferrite core 201 in the analyzed model.

Figure 8:
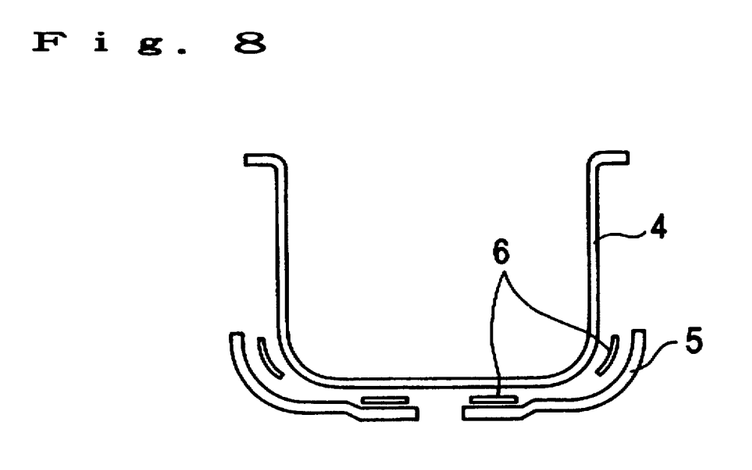
FIG. 8 is a section view of an induction heating structure which was used for verifying the calculation accuracy of the impedance calculation method of the embodiment.

In order to generalize the description irrespective of the shape of the rice cooker shown in FIG. 8, the analysis object is set so as to have a usual simple shape. However, the material properties of each of the components are the same as those of the rice cooker shown in FIG. 8. The material properties are listed in Table 1 below. In order to allow only the value of k to be changed, the frequency of the power supplied to the analysis object is fixed to 50 Hz.

TABLE 1

| MATERIAL PROPERTIES | | |
|---|---|---|
| Material | Relative Permeability | Conductivity (S/m) |
| aluminum | 1.0 | $3.57 \times 10^8$ |
| stainless steel | 100. | $1.667 \times 10^6$ |
| ferrite cores | 600. | 0 |

As shown in FIG. 2(B), the volume of the ferrite core 201 can be changed by increasing or decreasing the widths 201w in the circumferential direction of four cores 201a, 201b, 201c, and 201d constituting the ferrite core 201. FIG. 2(B) shows a state where the four cores are formed as sectors having the same radius.

According to this configuration, the value of k can be changed from 0 to 1. When all the widths 201w of the four cores 201a to 201d are set to be 0, k=0, and, when all the widths 201w are set to be maximum or the ferrite core 201 has a rotational body shape (a doughnut-like cylindrical shape in which a hole is opened at the center), k=1.

Figure 3A:
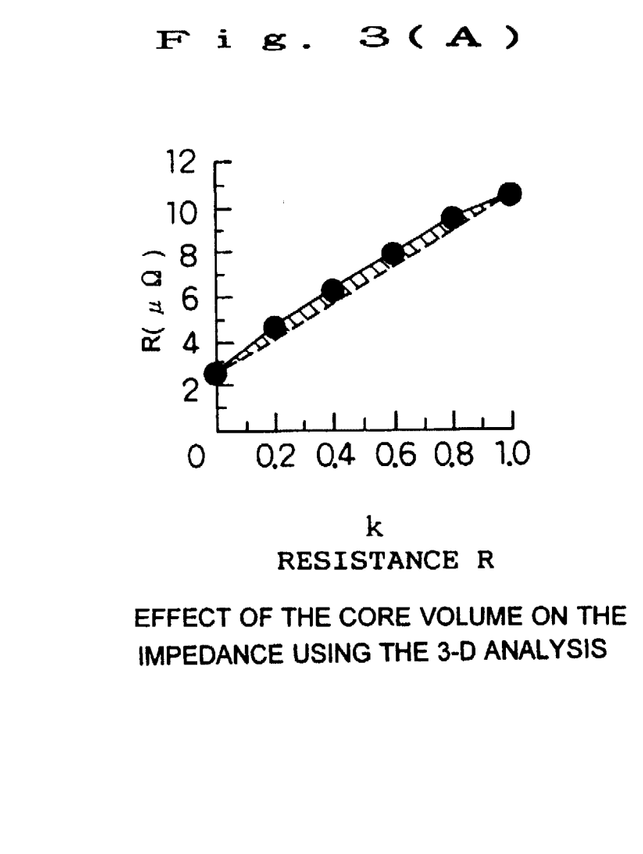
FIG. 3(A) is a graph showing variations of a resistance R in results of calculating the impedance of the analyzed model shown in FIG. 2(A) by a three-dimensional magnetic field analysis, and results of calculating the impedance of the analyzed model by using (Expression 3) according to the invention, while changing the volume ratio k of the ferrite core 201 in the analyzed model.
Figure 3B:
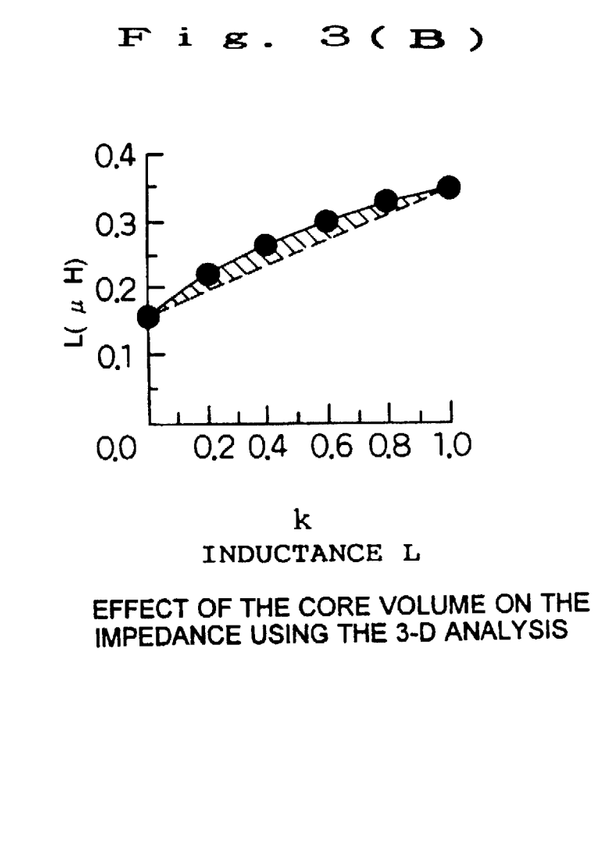
FIG. 3(B) is a graph showing variations of an inductance L in results of calculating the impedance of the analyzed model shown in FIG. 2(A) by the three-dimensional magnetic field analysis, and results of calculating the impedance of the analyzed model by using (Expression 3) according to the invention, while changing the volume ratio k of the ferrite core 201 in the analyzed model.

FIGS. 3(A) and 3(B) show variations of the impedance of the analysis object which were obtained when the volume of the ferrite core 201 was changed or the volume ratio k was changed to be 0, 0.2, 0.4, 0.6, 0.8, and 1.0.

In FIGS. 3(A) and 3(B), solid circles indicate results of impedance calculations using a three-dimensional magnetic field analysis method, and a solid line connects the solid circles. These values can be deemed as substantially true values. In the figures, results of impedance calculations using (Expression 3) above are indicated by broken lines. The hatched regions in the figures indicate the differences between the true values and the results of the calculations using (Expression 3), and show that the differences are very small.

As a result, the effectiveness of the hypothesis that a variation of the impedance is proportional to a change of the actual volume of the nonrotational body, i. e., the effectiveness of (Expression 3) has been confirmed.

(2) Next, modeling of an analysis object which is the principle of the invention, and a method of calculating an impedance in accordance with (Expression 3) above will be described.

In order to facilitate the understanding, two kinds of analyzed models (model 1 and model 2) which have been subjected to modeling, and a method of calculating an impedance will be sequentially described.

Figure 4:
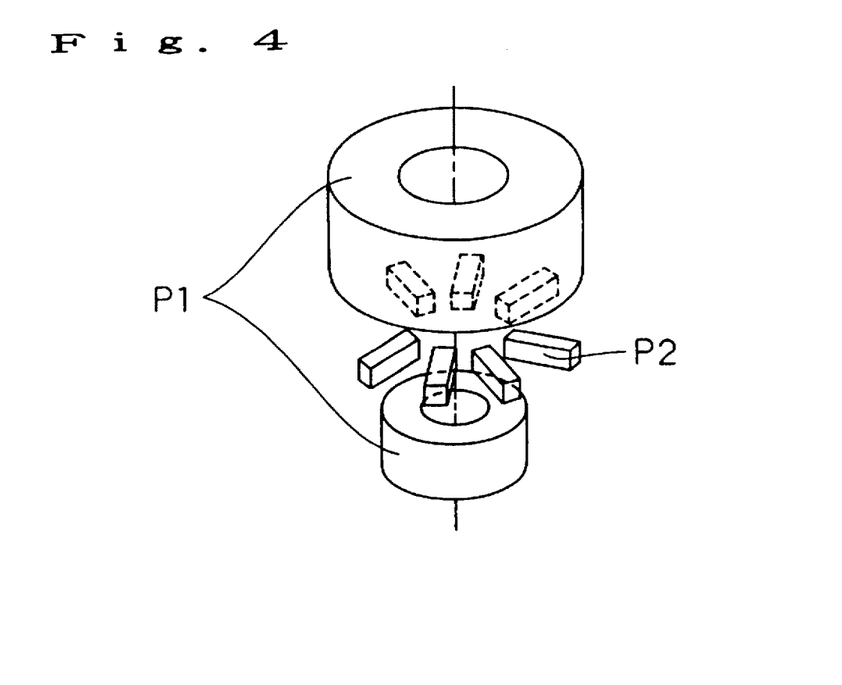
FIG. 4 is a diagram illustrating modeling of an electromagnetic part to which an axially symmetric three-dimensional magnetic field analysis method in an impedance calculation method of an embodiment of the invention is to be applied.
Figure 5:
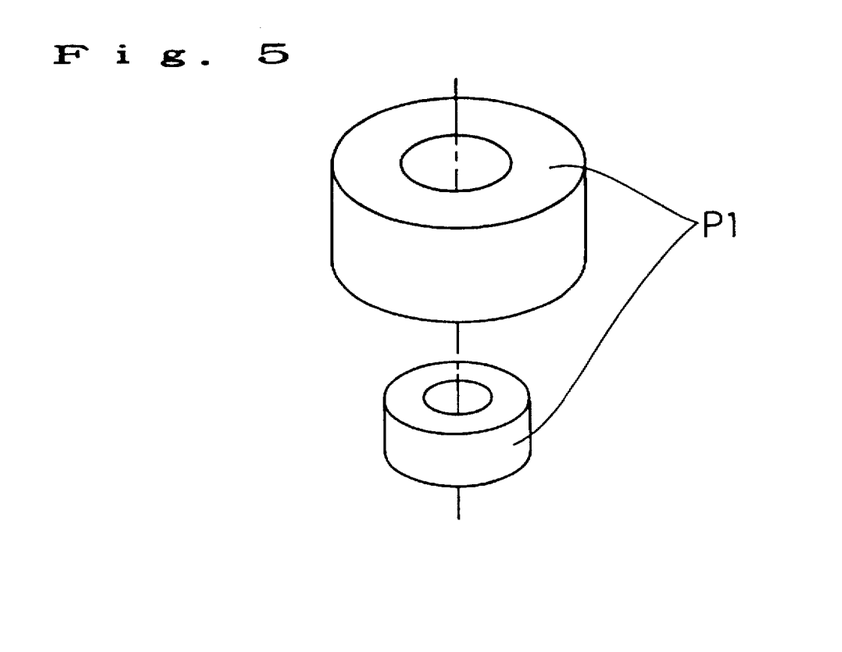
FIG. 5 is a diagram illustrating first modeling (model 1) for the electromagnetic part of FIG. 4 in the embodiment.
Figure 6:
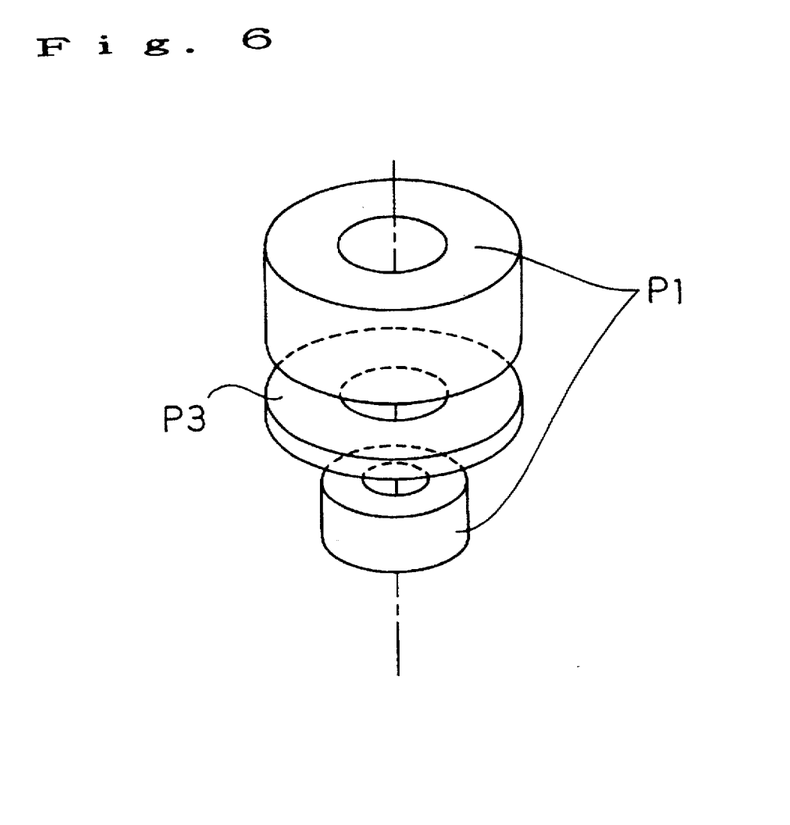
FIG. 6 is a diagram illustrating second modeling (model 2) for the electromagnetic part of FIG. 4 in the embodiment.

FIGS. 4 to 6 are diagrams illustrating a modeling method which is an embodiment of the impedance calculation method according to the invention, and in which an electromagnetic part is subjected to modeling so as to have a rotational body shape (an axially symmetric shape).

As shown in FIG. 4, the electromagnetic part consists of components P1 which are configured by windings, etc. and have a rotational body shape, and a single or plural components P2 which are arranged in a rotational body space (an axially symmetric space) at predetermined intervals in the circumferential direction of the rotational body. The components P2 are members of a nonrotational body shape.

(2-1)

The preparation of model 1 corresponding to the first analyzed model according to the invention will be described with reference to FIG. 5.

This modeling corresponds to Case B described above.

The components P2 which are members of a nonrotational body shape are removed from the electromagnetic part of the analysis object. The configuration consisting only of the members of a rotational body shape is set as model 1. In order to describe the shape of the electromagnetic part by means of a usual shape, description is conducted on the case where the components P1 have a simple cylindrical shape. Actually, however, the shape of the components P1, i.e., the shape of model 1 is considered to be a shape which faithfully shows the actual shape.

(2-2)

The preparation of model 2 corresponding to the second analyzed model according to the invention will be described with reference to FIG. 6. This modeling corresponds to Case A described above.

A virtual member P3 of a rotational body shape which includes the members P2 of a nonrotational body shape and which has an axis of rotation coincident with that of the member P1 of a rotational body shape is assumed. An object including the virtually assumed rotational body P3 and the actual members P1 of a rotational body shape is set as model 2. It is assumed that the virtually assumed member P3 of a rotational body shape is made of the same material as that configuring the actual member P2 of a nonrotational body shape.

(2-3)

Next, a method of correcting an impedance by using (Expression 3) will be described.

In accordance with (Expression 3) using the volume ratio k of P2 with respect to P3 {k=(the volume of P2)/(the volume of P3)} and the impedances Z1 and Z2 of models 1 and 2, the impedance Z of the electromagnetic part configured by the original components P1 and P2 are approximately calculated.

Figure 7:
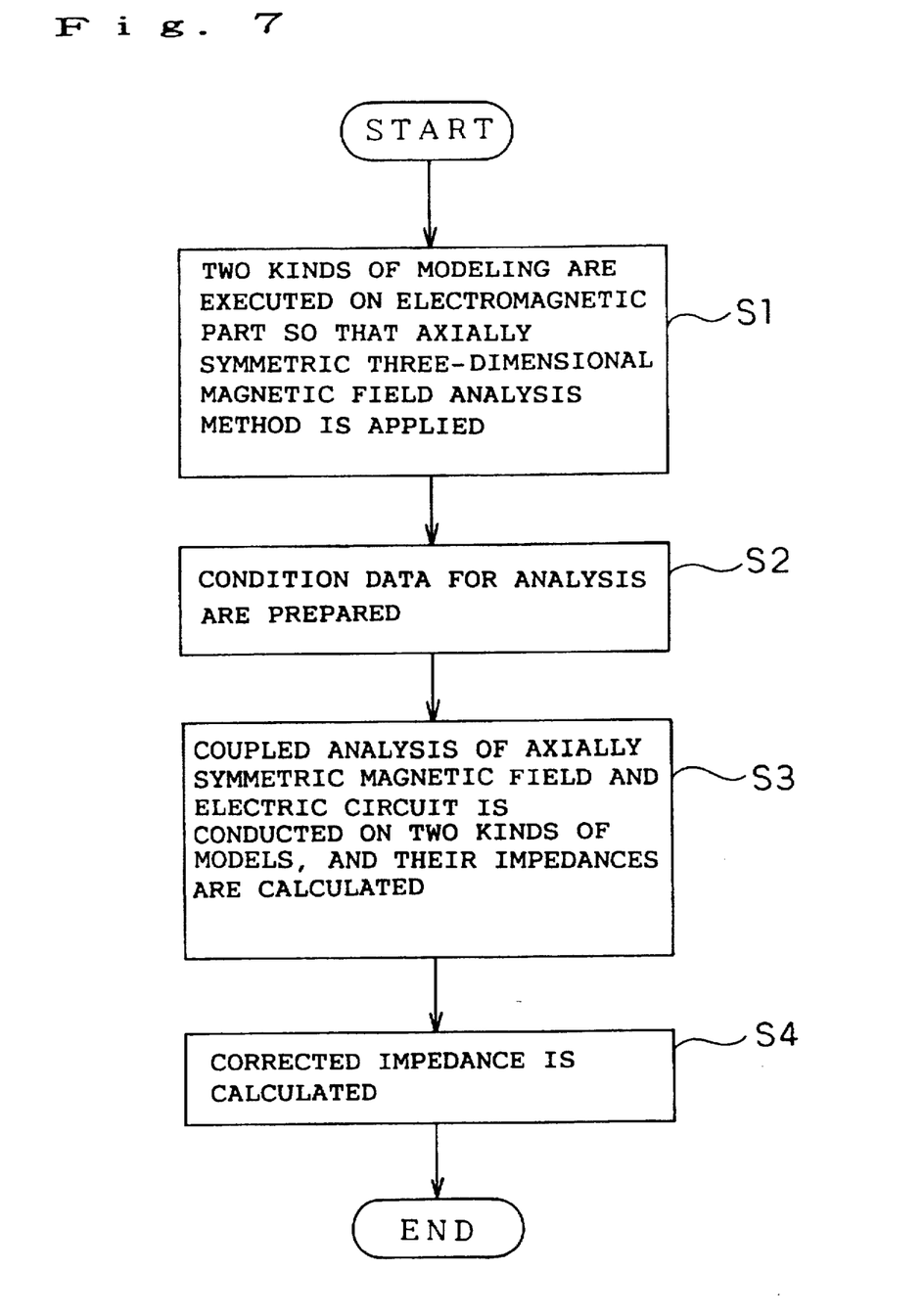
FIG. 7 is a flowchart of the impedance calculation method of the embodiment.

The operation of the impedance calculation method of the embodiment will be described with reference to a flowchart shown in FIG. 7.

First, models 1 and 2 described above are divided by a finite elements, and data of nodes and elements which are obtained by the division are prepared (step S1). Next, data indicative of the material properties, and various condition data such as an AC voltage to be applied to the winding, and predetermined boundary conditions are prepared (step S2). Thereafter, each of models 1 and 2 is subjected to a coupled analysis of an axially symmetric magnetic field analysis and an electric circuit analysis, so that a current flowing through the circuit in response to an application of the voltage is obtained and, in accordance with (Expression 1), the impedances of models 1 and 2 are obtained (step S3).

Finally, in accordance with (Expression 3) using the obtained impedances Z1 and Z2 and the value of the volume ratio k, the impedance Z of the electromagnetic part of the original shape is calculated (step S4).

The processing of step S1 in which the components are subjected to modeling may be conducted by the operator oneself. It is a matter of course that modeling means which can automatically conduct the modeling may be configured. In such modeling means, shape data of each component are automatically input by using an image processing technique or the like, and it is automatically judged on the basis of the input shape data whether the component has a nonrotational body shape or a rotational body shape.

The operations of the steps such as step S3 correspond to those of the first and second analysis means of the invention, and the operation of step S4 corresponds to that of the calculation means of the invention.

(3) Results of calculation in which the impedance calculation method of the embodiment is applied to an induction heating structure of an actual apparatus were compared with results of experiments which were actually conducted so as to measure impedances. The comparison of the results will be described.

Figure 9:
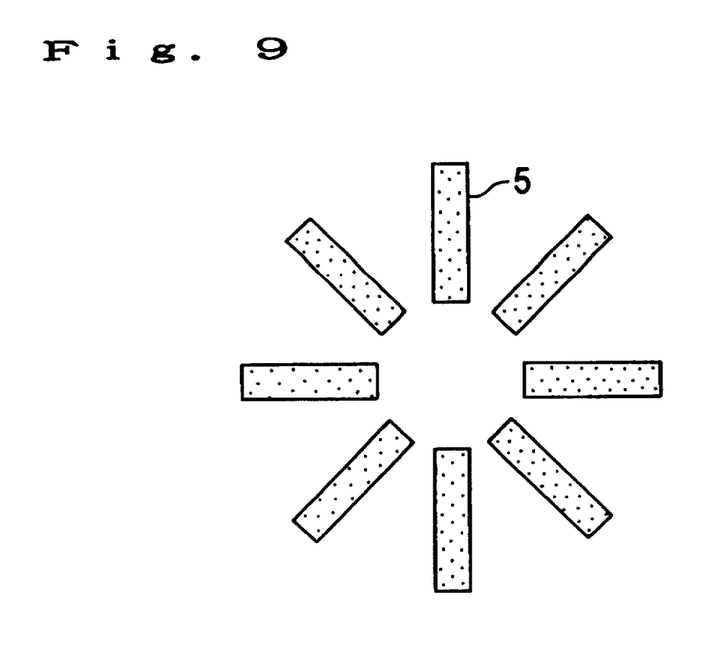
FIG. 9 is a plan view of a core of the induction heating structure which was used for verifying the calculation accuracy of the impedance calculation method of the embodiment.

FIG. 8 shows a section structure of the induction heating structure which is an analysis object. The heating structure comprises a winding (double coil) 6 and a pot 4 which have a rotational body shape, and eight ferrite cores 5 which are radiatelly arranged about the axis of rotation of the rotational body shapes. As shown in FIG. 9, the ferrite cores 5 are members of a nonrotational body shape. The pot 4 consists of two layers of aluminum and stainless steel. Assuming that aluminum and stainless steel are free from magnetic saturation, a linear analysis is conducted in which relative magnetic permeabilities of ferrite and stainless steel are set to be 600 and 100, respectively. The properties of the materials are listed in Table 1. A sinusoidal AC voltage was applied to the winding 6. In this case, the volume ratio k is 0.15237.

Figure 10:
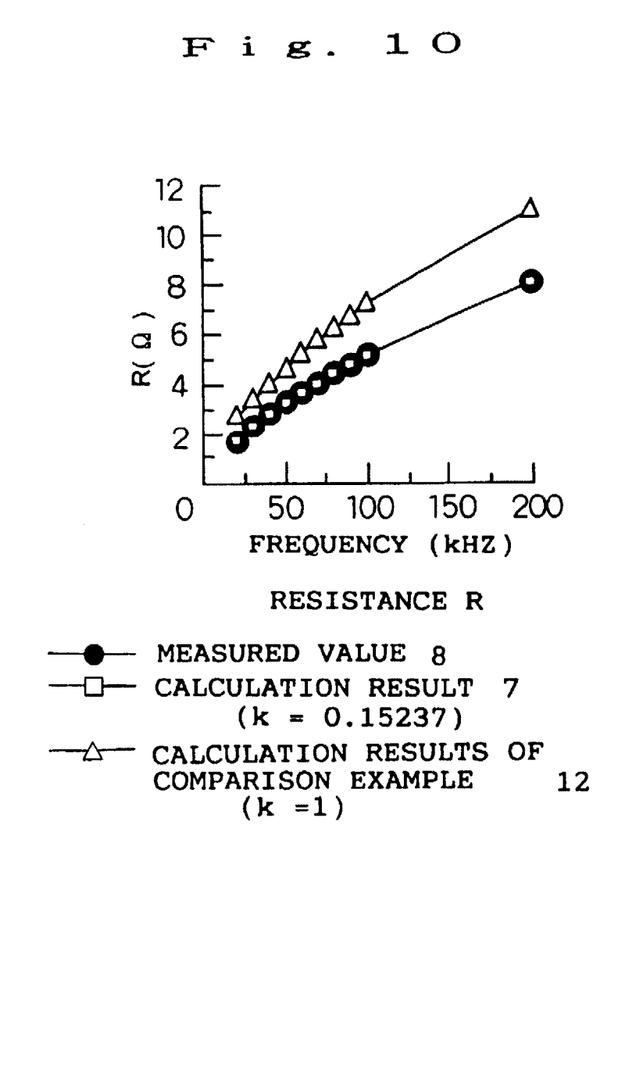
FIG. 10 is a graph showing frequency characteristics of the resistance R which were obtained by experiments and calculations in the embodiment.
Figure 11:
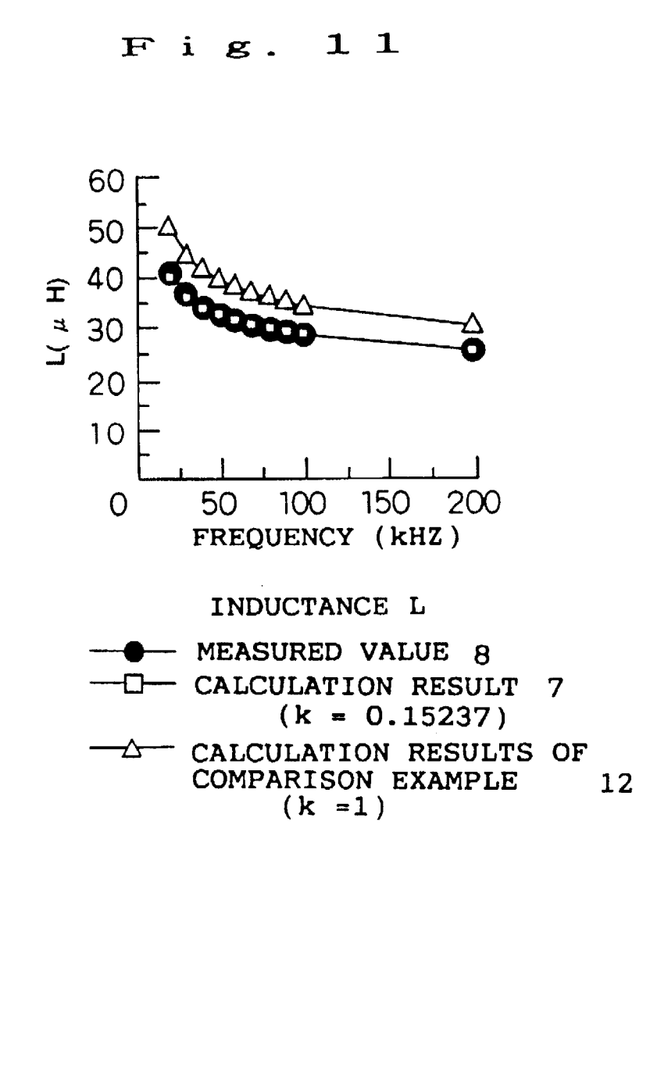
FIG. 11 is a graph showing frequency characteristics of the inductance L which were obtained by experiments and calculations in the embodiment.

FIGS. 10 and 11 show frequency characteristics of the resistance R and inductance L which were obtained by experiments and calculation using (Expression 3) with changing the frequency in the range of 20 to 200 kHz. Their values are listed in Tables 2 and 3 below.

As a comparison example, the impedances in the case of k=1 were calculated. Also the calculation results are listed in the tables. As seen from FIGS. 10 and 11, calculation results 7 correspond to experiment results 8 in a very satisfactory manner. Also when compared with calculation results 12 of the comparison example, it will be seen that the calculation results 7 according to (Expression 3) have very accurate values. From the above, the adequacy of the invention has been confirmed.

TABLE 2

| | (k = 0.15237) | RESISTANCE R (Ω) | |
|---|---|---|---|
| FREQUENCY (kHZ) | EXPERIMENT RESULT | INTERPOLATION | CASE OF k = 1 |
| 2e+1 | 1.65e+0 | 1.770775279e+0 | 2.7258e+0 |
| 3e+1 | 2.4e+0 | 2.335272077e+0 | 3.4644e+0 |
| 4e+1 | 2.85e+0 | 2.806930168e+0 | 4.0838e+0 |
| 5e+1 | 3.35e+0 | 3.248745484e+0 | 4.667e+0 |
| 6e+1 | 3.7e+0 | 3.674255158e+0 | 5.2283e+0 |
| 7e+1 | 4.1e+0 | 4.084015398e+0 | 5.7669e+0 |
| 8e+1 | 4.45e+0 | 4.476704308e+0 | 6.2808e+0 |
| 9e+1 | 4.75e+0 | 4.851652362e+0 | 6.7695e+0 |
| 1e+2 | 5.15e+0 | 5.209566219e+0 | 7.2343e+0 |
| 2e+2 | 8.12237e+0 | 8.152332496e+0 | 1.1018e+1 |

TABLE 2-continued

| (k = 0.15237) | | RESISTANCE R (Ω) | |
|---|---|---|---|
| FREQUENCY (kHZ) | EXPERIMENT RESULT | INTERPOLATION | CASE OF k = 1 | peq = p × 10$^q$
where p:mantissa, q:exponent
ex. 2e+1 = 2 × 10$^{+1}$

TABLE 3

| (k = 0.15237) | | INDUCTANCE L (μH) | |
|---|---|---|---|
| FREQUENCY (kHZ) | EXPERIMENT RESULT | INTERPOLATION | CASE OF k = 1 |
| 2e+1 | 4.11e+1 | 4.020614658e+1 | 5.0237e+1 |
| 3e+1 | 3.69e+1 | 3.626182531e+1 | 4.4622e+1 |
| 4e+1 | 3.425e+1 | 3.411344514e+1 | 4.1676e+1 |
| 5e+1 | 3.26e+1 | 3.269102314e+1 | 3.9745e+1 |
| 6e+1 | 3.15e+1 | 3.162037086e+1 | 3.8298e+1 |
| 7e+1 | 3.06e+1 | 3.075512714e+1 | 3.7131e+1 |
| 8e+1 | 2.98e+1 | 3.003033036e+1 | 3.6157e+1 |
| 9e+1 | 2.93e+1 | 2.94085426e+1 | 3.5325e+1 |
| 1e+2 | 2.88e+1 | 2.886939253e+1 | 3.4607e+1 |
| 2e+2 | 2.57754e+1 | 2.579999547e+1 | 3.0573e+1 |

In the experiments described above, the impedances were measured with using an impedance analyzer which was connected in place of a sinusoidal AC voltage source.

Figure 12:
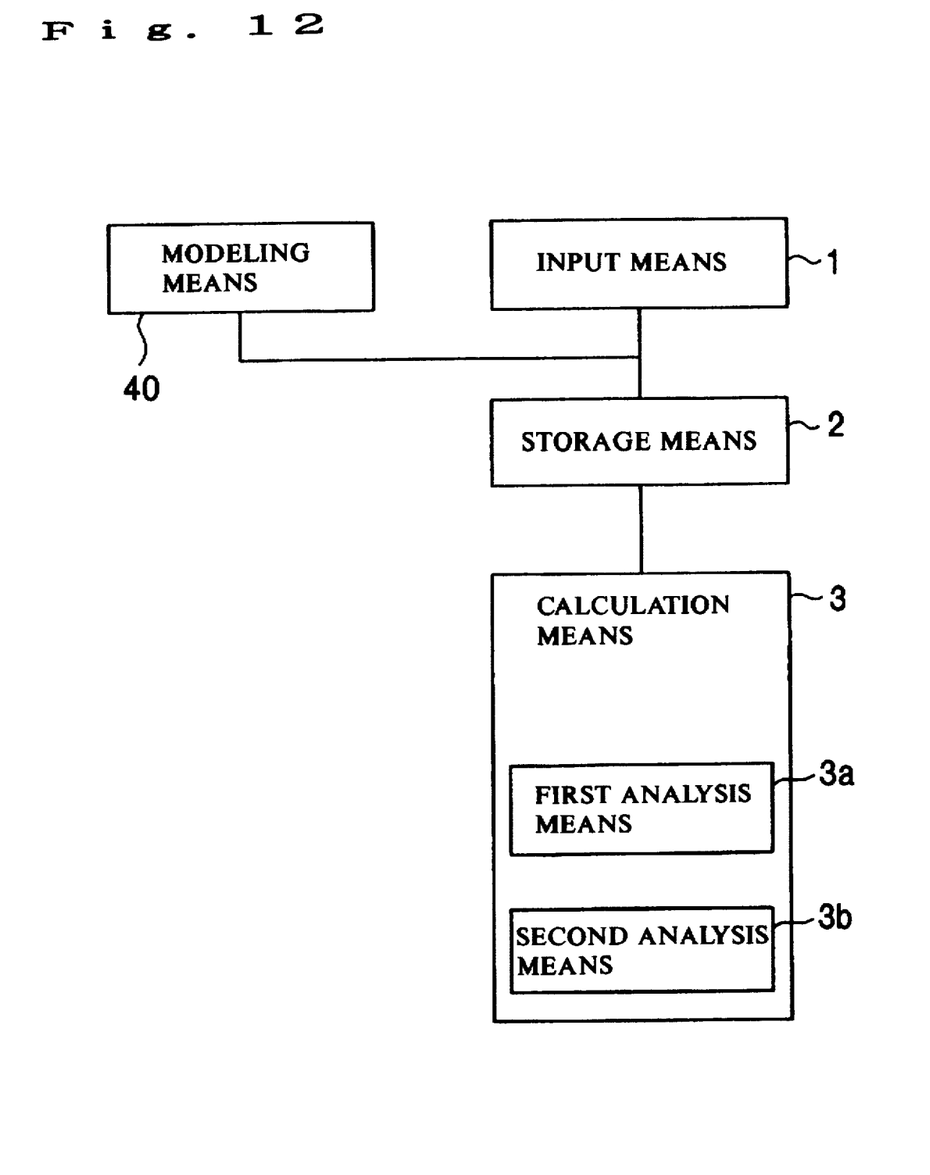
FIG. 12 is a block diagram of an impedance calculation apparatus which executes the impedance calculation method of the embodiment.

FIG. 12 is a block diagram showing the configuration of an impedance calculation apparatus which executes the impedance calculation method of the embodiment.

The reference numeral 1 designates input means such as a keyboard or a mouse, for inputting various kinds of information including data of nodes and elements which are obtained by dividing the electromagnetic part subjected to modeling as described above and its peripheral air region by a finite elements, data indicative of the material properties, the AC voltage to be applied to the winding, and the boundary conditions. The reference numeral 2 designates storage means such as a RAM or a magnetic disk, for storing the data input through the input means 1, and 3 designates calculation means for calculating the impedance from the data stored in the storage means 2 in accordance with an axially symmetric magnetic field analysis method, (Expression 1), and (Expression 3).

In the impedance calculation apparatus configured by these components, the relationships between the components and the operations are as follows.

Various kinds of information including data of nodes and elements which are subjected to modeling, data indicative of the material properties, the AC voltage to be applied to the winding, and the boundary conditions are inputed through the input means 1 such as a keyboard or a mouse, and the data are then stored in the storage means 2 such as a RAM or a magnetic disk. In other words, various data prepared in steps S1 and S2 described above are inputed through the input means 1. The calculation means 3 reads the data of the storage means 2 and calculates the impedance in accordance with the axially symmetric magnetic field analysis method, (Expression 1), and (Expression 3). Calculation means 3 performs steps S3 and S4, as described above. The operation of step S3 corresponds to the first and second analysis means, as explained above and as illustrated in FIG. 12 by reference numerals 3a and 3b. As such, step S3 is performed by first and second analysis means 3a and 3b within calculation means 3, as illustrated in FIG. 12. Alternatively, modeling means 40 which conducts the modeling processing as described above may be connected between the input means 1 and the storage means 2, thereby reducing the burden of input operations to be performed by the operator.

As described above, according to the embodiment, an axially symmetric magnetic field analysis method can be applied to the calculation of the impedance of the electromagnetic part in which both the component P1 including the winding and having a rotational body shape (an axially symmetric shape), and a single or plural components P2 which are in a nonrotational body space (an axially asymmetric space) and arranged at predetermined intervals in the circumferential direction of the rotational body coexist. Namely, in the embodiment, two kinds of modeling, i.e., model 1 consisting only of P1, and model 2 consisting of P1 and P3 of a rotational body shape in which it is assumed that the rotational body space (the axially symmetric space) including P2 is closely uniformly filled with the same material as that of P2 are conducted. The impedance of the electromagnetic part which is originally configured by P1 and P2 can be approximately calculated from the impedances of the models and the volume ratio of P2 with respect to P3 {(the volume of P2)/(the volume of P3)}.

As described above, in a prior art impedance calculation apparatus, the impedance of an electromagnetic part is obtained from results of a three-dimensional magnetic field analysis in which the calculation cost is high. By contrast, in the invention, the fact that the impedance of an electromagnetic part is closely related to the volumes of components of the part is considered, and the electromagnetic part is subjected to modeling so that an axially symmetric magnetic field analysis method in which the calculation time is remarkably shorter than a three-dimensional magnetic field analysis method and data for analysis can be easily prepared can be applied, thereby attaining an excellent practical effect that, in the calculation of the impedance of the electromagnetic part, the cost can be reduced and the accuracy can be enhanced.

What is claimed is:

1. An impedance calculation method for calculating an impedance of an analysis object comprising a member having a substantially rotational body shape and a member having a nonrotational body shape, said method comprising the steps of:

conducting first impedance analysis on a first analyzed model which is configured by said member having the substantially rotational body shape, said impedance analysis yielding a first result conducting second impedance analysis on a second analyzed model which is configured by said member having the substantially rotational body shape and a rotational body including said member having the nonrotational body shape, said rotational body having an axis of rotation coincident with an axis of rotation of said member having the substantially rotational body shape, said impedance analysis yielding a second result, and calculating the impedance of said analysis object using the first and second results of said first and second analyzed models, respectively.

2. An impedance calculation method according to claim 1, wherein said member having the substantially rotational body shape includes a winding, and said member having the nonrotational body shape does not include a winding.

3. An impedance calculation method according to claim 1, wherein said impedance of said analysis object is an intermediate value in a range between said first and second results of said first and second analyzed models, respectively.

11

4. An impedance calculation method according to claim 1, wherein the step of calculating the impedance uses a volume ratio of a volume of said member having the nonrotational body shape to a volume of said rotational body.

5. An impedance calculation method according to claim 1, wherein the step of calculating calculates the impedance, Z, according to a calculation expression of $Z=k \times Z2+(1-k) \times Z1$ where a volume ratio k is the ratio of (a volume of said member having the nonrotational body shape)/(a volume of said rotational body, Z1 is the first result of said first analyzed model, and Z2 is the second result of said second analyzed model.

6. An impedance calculation apparatus for calculating an impedance of an analysis object comprising a member having a substantially rotational body shape and a member having a nonrotational body shape, said apparatus comprising:

first analysis means for conducting first impedance analysis to determine a first result on a first analyzed model which is configured by said member having the substantially rotational body shape;

second analysis means for conducting second impedance analysis to determine a second result on a second analyzed model which is configured by said member having the substantially rotational body shape and a rotational body including said member having the nonrotational body shape, said rotational body having an axis of rotation coincident with an axis of rotation of said member having the substantially rotational body shape; and calculation means for calculating the impedance of said analysis object by using the first and second results obtained by said first and second analysis means, respectively.

7. An impedance calculation apparatus according to claim 6, wherein said member having the substantially rotational body shape includes a winding, and said member having the nonrotational body shape does not include a winding.

8. An impedance calculation apparatus according to claim 6, wherein said impedance of said analysis object is an intermediate value in a range between said first and second results of said first and second analyzed models, respectively.

9. An impedance calculation apparatus according to claim 6, wherein said calculation means uses a volume ratio of a volume of said member having the nonrotational body shape to a volume of said rotational body.

10. An impedance calculation apparatus according to claim 6, wherein said calculation means calculates the impedance, Z, according to a calculation expression of $Z=k \times Z2+(1-k) \times Z1$ where a volume ratio k is (a volume of

12 said member having the nonrotational body shape)/(a volume of said rotational body, Z1 is the first result of said first analyzed model, and Z2 is the second result of said second analyzed model.

11. A method for determining the impedance of a structure having at least one rotational body shaped element formed by rotating a first plane figure around a first axis of rotation and at least one nonrotational body shaped element, said method comprising the steps of:

determining a first impedance of the structure using only the at least one rotational body shaped element;

determining a second impedance of the structure using (1) the at least one rotational body shaped element and (2) a rotational body formed by rotating a second plane figure around a second axis of rotation and encompassing the at least one nonrotational body shaped element, said second axis of rotation coincident with the first axis of rotation; and calculating the impedance of the structure as a function of the first impedance and second impedance.

12. A method of determining the impedance of a structure of claim 11 wherein the step of calculating includes calculating the impedance of the structure as a function of a volume of the nonrotational body shaped element and a volume of the rotational body.

13. An impedance determination apparatus for determining the impedance of a structure having at least one rotational body shaped element formed by rotating a first plane figure around a first axis of rotation and at least one nonrotational body shaped element, said apparatus comprising:

first analysis means for determining a first impedance of the structure using only the at least one rotational body shaped element;

second analysis means for determining a second impedance of the structure using (1) the at least one rotational body shaped element and (2) a rotational body formed by rotating a second plane figure around a second axis of rotation and encompassing the at least one nonrotational body shaped element, said second axis of rotation coincident with the first axis of rotation; and calculation means for calculating the impedance of the structure as a function of the first impedance and second impedance.

14. An impedance determination apparatus of claim 13, wherein the calculation means further includes means for calculating the impedance of the structure as a function of a volume of the nonrotational body shaped element and a volume of the rotational body.

* * * * *

UNITED STATES PATENT AND TRADE MARK OFFICE
CERTIFICATE OF CORRECTION

PATENT NO.   : 5,781,020
DATED        : July 14, 1998
INVENTOR(S)  : Imai et al.

It is certified that error appears in the above-identified patent and that said Letters Patent is hereby corrected as shown below:

On the cover page, item [56] References Cited, U.S. Patent Documents, add --4,496,907  1/1985  Funk et al.--.

On the cover page, item [56] References Cited, add, Foreign Patent Documents, --05299164A  11/1993  Japan--.

Column 12, line 22, after "11" insert a comma --,--.

Signed and Sealed this

Thirtieth Day of March, 1999

Attest:

Q. TODD DICKINSON

*Attesting Officer*    *Acting Commissioner of Patents and Trademarks*